July 10, 1928.
D. F. MURPHY ET AL
1,676,571
ELECTRIC SIGNALING DEVICE FOR VEHICLES
Filed March 6, 1922       3 Sheets-Sheet 2
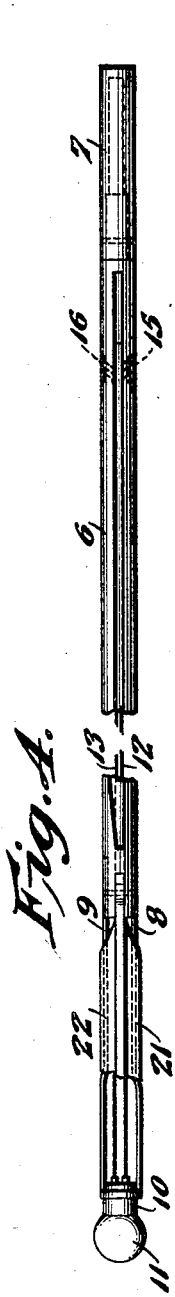
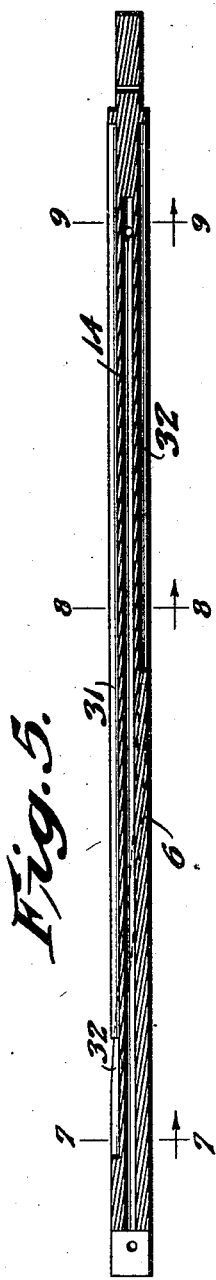
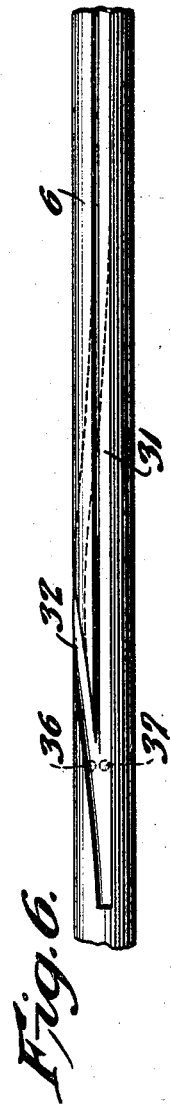
Inventor
Daniel F. Murphy
and Luke Cotter
By McCracken + Patch
Attorneys July 10, 1928.
D. F. MURPHY ET AL
1,676,571
ELECTRIC SIGNALING DEVICE FOR VEHICLES
Filed March 6, 1922    3 Sheets-Sheet 3
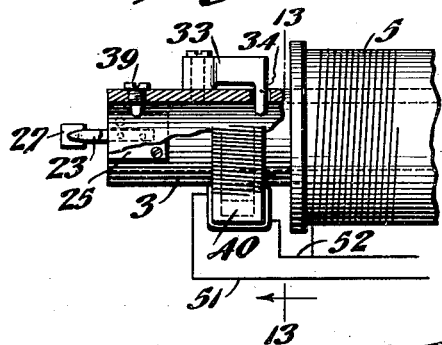
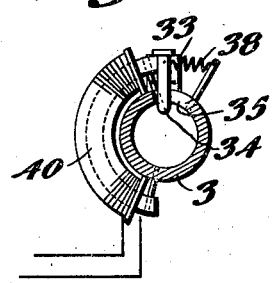
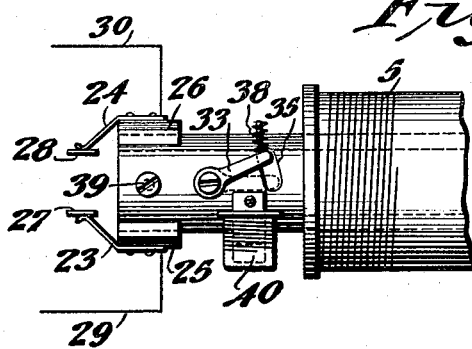
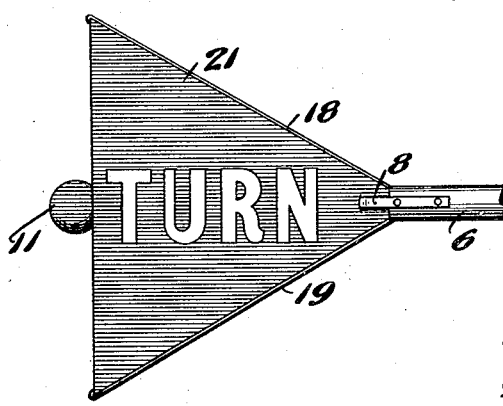
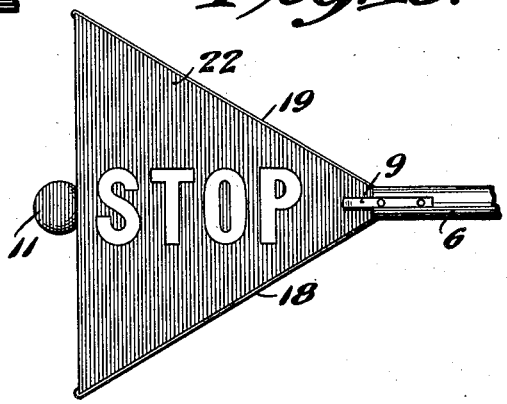
Inventor
Daniel F. Murphy
and Luke Cotter
By McCracken + Patch
Attorneys Patented July 10, 1928.

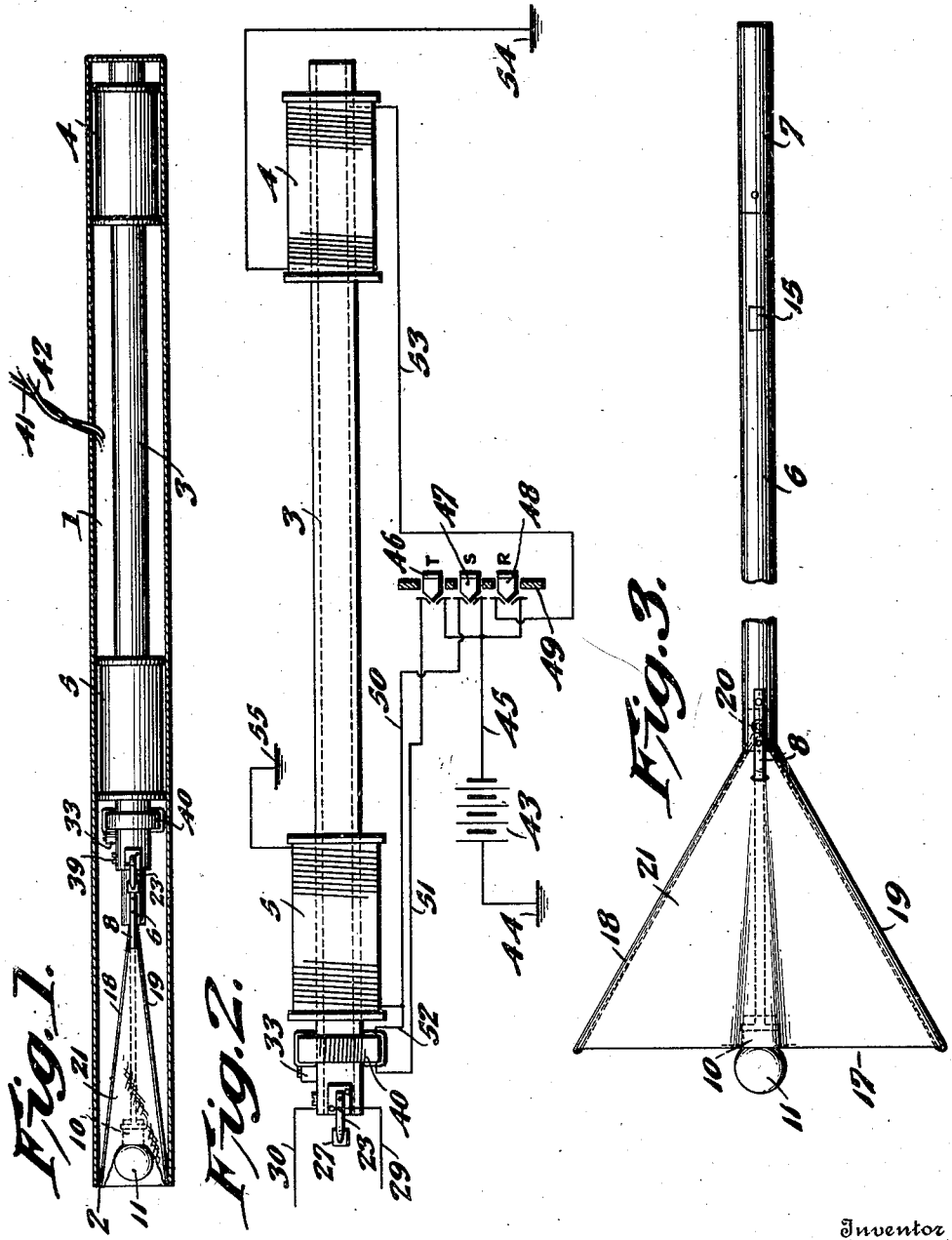

1,676,571

UNITED STATES PATENT OFFICE.

DANIEL F. MURPHY AND LUKE COTTER, OF BOISE, IDAHO.

ELECTRIC SIGNALING DEVICE FOR VEHICLES.

Application filed March 6, 1922. Serial No. 541,440.

This invention relates to electric signaling devices for vehicles, and particularly to a device of this character for use on automobiles and other vehicles, especially the closed types.

An object of our invention is to provide a device to take the place of hand signals commonly used to comply with traffic regulations, and which can not be given from closed automobiles or other vehicles, and even when given are often either not visible or not discerned by the party being signaled.

A further object resides in providing a structure which is very compact and which includes a tubular casing which can be readily installed on either side of the vehicle, thus adapting the device to be used for right hand traffic or for left hand traffic.

A still further object lies in providing an electric operating mechanism for the signal structure and in arranging a convenient control for this structure.

Yet another object consists in providing colored signals which will attract the eye and by their color will indicate the intention of the driver of the vehicle, and in arranging colored lights which will be visible and will give the desired signals at night.

With these and other objects in view which will be apparent from the drawings, specification and claims, this invention includes certain novel features of construction and combinations of parts which will now be set forth.

In the drawings:

Figure 1 is a view in section through the tubular case showing the parts in the retracted or inoperative relation.

Fig. 2 is a view in elevation of the electric operating structure with the circuit arrangements diagrammatically illustrated.

Fig. 3 is a view in side elevation of the signal and operating plunger.

Fig. 4 is a view in top edge elevation of the structure illustrated in Fig. 3 with parts broken away.

Fig. 5 is a longitudinal sectional view through the plunger.

Fig. 6 is an enlarged detail of the plunger to better show the arrangement of the guiding grooves therein.

Fig. 7 is a transverse section on the line 7—7 of Fig. 5.

Fig. 8 is a sectional view on line 8—8 of Fig. 5.

Fig. 9 is a section on line 9—9 of Fig. 5.

Fig. 10 is a side elevation of one of the electric coils forming the operating means.

Fig. 11 is an end elevation of the coil.

Fig. 12 is an enlarged detail of the forward end of the plunger guide showing the switch arrangement.

Fig. 13 is a sectional view on line 13—13 of Fig. 12.

Fig. 14 is a top plan view of the structure shown in Fig. 12.

Fig. 15 is a detail view showing one form the signal might take.

Fig. 16 is a view similar to Fig. 15 showing the reverse side of the signal.

Broadly our signal device consists of a folding flag and an electric lamp which are shifted to an extended position to be visible and are retracted, the electrical operating means being arranged to permit selective showing of opposite sides of the flag and lamp, and these opposite sides being differently colored or otherwise designated to indicate different operations to which the vehicle is subject.

A case 1 is made of tubular form and is the support and housing for our signaling device, this case completely covering all portions when no signal is being given. By the use of any suitable form of brackets or other supports this case 1 can be mounted in any desired position upon the vehicle. The position and manner of mounting will conform to the particular vehicle and the personal wishes of the owner, or will be governed by legal requirements. On some automobiles the device might be placed at the base of the windshield at the outside of the car, and in other uses it may be placed within the vehicle and may have its open end 2 extending through a hole in the body. The case will be finished in any desired manner, and will have its open end to the left or the right hand to suit traffic requirements.

A tube or guide 3, which will be of wrought iron or other material readily magnetized and demagnetized, is adapted to be disposed centrally within the case 1, and at the inner end of the case this guide tube has a return coil or solenoid 4 wound on its outer surface, a drawing coil or solenoid 5 being built around the remaining end of the guide tube 3, this end being toward the open end 2 of the case.

A plunger 6, of vulcanized fiber or other suitable insulating material, is adapted to fit and slide within the guide tube 3, and at its inner end has a drawing core 7, of soft iron or other suitable material which will be readily responsive to attractive magnetism induced in the guide tube 3 by the passage of electrical current selectively through the coils 4 or 5, and these coils are so wound that the coil 5 exerts attraction to extend the plunger 6 from the open end 2 of the case, the coil 4 being wound to attract the core 7 and retract or return the plunger 6. At the outer end of the plunger 6 the supporting wires 8 and 9 extend forwardly, and these supporting wires carry a lamp socket 10 in which a lamp 11 is fitted. Circuit wires 12 and 13 extend from the lamp socket rearwardly through an opening 14 in the plunger 6, and connect with contact plates 15 and 16 disposed on the sides of the plunger adjacent the rear end thereof.

While the lamp will be visible as a signal it is preferable that other means be provided to attract attention, and for this purpose we provide the flag generally indicated at 17. This flag consists of the spring members 18 and 19 which are secured in the forward end of the plunger 6 by a pin 20 so that they extend in spread angular relation, and the side pieces 21 and 22 of silk or other fabric mounted on and supported by the springs. The members 18 and 19 may be made of watch spring material and preferably each consists of a length of spring doubled back so that spring portions are presented to engage with the case 1 at the open end 2 when the magnet 4 is energized to draw the plunger into the guide tube and consequently retract the signal flag.

The contacts 15 and 16 are so placed that when the plunger is drawn forward to display the signal flag these contacts are beyond the end of the guide tube 3, and to establish a circuit for the lamp 11 spring contact fingers 23 and 24 are mounted on insulating blocks 25 and 26 on the forward end of tube 3 with their free ends disposed against the plunger, plates 27 and 28 being provided to engage the contacts 15 and 16. Circuit wires 29 and 30 are connected with the spring contacts and with any suitable source of electric current.

With the arrangement as herein described the signal flag will be displayed when the drawing coil 5 is energized and the circuit is completed through the lamp 11 when the flag is extended; and, when return coil 4 is energized the core is retracted to draw the signal flag back into the case, the circuit through lamp 11 being broken. This signal indication however would not give specific directions as to the driving intention of the occupant of the vehicle, and it is preferable that the two sides of the signal be made of different color, for instance red and blue, as shown in Figs. 15 and 16, and that arrangement be made to selectively display either side of the flag. The material of the two sides 22 and 21 of the flag can have wording such as "stop" and "turn" displayed in white or a contrasting color thereon, and the two sides of the lamp bulb 11 can be tinted in corresponding colors so that the luminous night signal will be of the same color as the flag displayed by day.

With the above purpose in view we provide a longitudinal groove 31 on the top of the plunger 6 and a second groove 32 extending in branched relation from the groove 31, as shown in Fig. 6, and in a helical curve for a half turn around the plunger to a point substantially diametrically opposite the groove 31, where this groove 32 is continued in a line parallel with the axis of the plunger.

Adjacent the outer end of the guide tube 3 a switch or guide member 33 is pivotally mounted, this member having a point 34 extending through a slot 35 in the guide tube and disposed in the grooves of the plunger. The slot 35 is made sufficiently long that the guide switch 33 can be swung to dispose the point 34 in either of the two positions indicated at 36 and 37, in Fig. 6, and a coil spring 38 is provided to normally hold the guide switch with its point at 36. A screw 39 is provided in the forward end of the tube 3 with its point extending to project within the forward end of the groove 31 and center the retracted plunger irrespective of the position of the guide switch 33.

To shift the guide switch 33 from the position at 36 an electro-magnet 40 is provided, this magnet being formed as best shown in Fig. 13 so that its core follows the periphery of the guide tube and the magnet will thus fit within the case 1. When the magnet 40 is energized the guide switch 33 is drawn to the position at 37 and will be maintained in this position until the coil of the magnet is deenergized. When the switch point is at 36 and coil 5 is energized the plunger will be extended with the switch point in the groove 32 and consequently the plunger is revolved through one-half turn to show the side 22. When coil 5 is deenergized the signal will remain extended and when coil 4 is energized the plunger will be again returned, the switch point and the screw 39 centering or properly positioning the plunger. When the electro-magnet 40 and the drawing coil 5 are simultaneously energized the switch point is drawn over to 37 and the plunger is extended without being rotated, thus displaying the side 21 of the flag.

The circuit wiring to the various coils can be arranged in any desired manner and it is preferable that all wires be carried in the cables 41 and 42. We have found that the circuit arrangement diagrammatically shown in Fig. 2 operates efficiently, and as here illustrated the battery or source of current at 43 is grounded at 44 on one terminal and has a circuit wire 45 connected with the opposite terminal. Three switch buttons 46, 47 and 48 are carried by a plate 49, which can be mounted on the steering post of an automobile or at any other convenient point upon a vehicle. The circuit wire 45 has leads extending to one of the contacts for each of the buttons. A circuit wire 50 is led from the opposite terminal of switch 47 to the coil 5, circuit wire 51 extends from the remaining terminal of switch button 46 to the magnet 40 and a lead 52 then extends to the coil 5, and a wire 53 is led from the free terminal of switch 48 to the coil 4. The opposite terminal of the coils 4 and 5 are grounded at 54 and 55. By this circuit arrangement as button 46 is pressed the signal will be displayed to indicate that the vehicle is about to turn, and when button 46 is released and button 48 is pressed coil 4 is energized to return the plunger and signal. When button 47 is pressed the plunger is extended to display the signal flag and lamp to indicate that the vehicle will stop. The buttons 46, 47 and 48 may be marked "Turn", "Stop", and "Return", or with the initial letters as a guide to the operator.

The various parts may be constructed in any approved manner and can be held in assembled relation as desired, the clips 56 being shown, in Figs. 10 and 11, to hold the drawing and return coils 5 and 4 in place, and the coil of magnet 40 being assembled in a like or any approved manner.

While, in the foregoing, we have described specific embodiments, and have mentioned only certain possible modifications, it will be appreciated that in practice we do not limit ourselves to such specific details as herein set forth, but may resort to any practical modifications falling within the scope of the invention as defined in the appended claims.

We claim:

1. An electric signaling device for vehicles comprising a tubular case open at one end to be mounted upon a vehicle, a guide tube of readily magnetized material mounted within the tubular case with its outer end somewhat within the open end of the case, a return coil or solenoid disposed around the inner end of the guide tube, a drawing coil or solenoid disposed around the outer end of the guide tube, a plunger of insulating material fitted slidably within the guide tube, a drawing core carried at the inner end of said plunger, a collapsible and extensible flag mounted at the outer end of the plunger, circuit wiring from a suitable source of electric supply to selectively energize the drawing coil to project the signal flag to permit the same to expand beyond the open end of the case and to energize the return coil to retract the signal flag to be collapsed in the outer end of the case, said signal flag having different traffic indications on the two sides thereof, said plunger being provided with a longitudinal guide groove on one side and having a second guide groove branching helically therefrom and extending longitudinally on the opposite side, a plunger guiding switch mounted on the guide tube and having a point projecting into the guide grooves, a spring normally holding the switch with the point positioned to track in one of the grooves, and electrical means to shift the switch to position the point to track in the remaining guide groove.

2. An electric signaling device for vehicles comprising a tubular case open at one end to be mounted upon a vehicle, a guide tube of readily magnetized material mounted within the tubular case with its outer end somewhat within the open end of the case, a return coil or solenoid disposed around the innner end of the guide tube, a drawing coil or solenoid disposed around the outer end of the guide tube, a plunger of insulating material fitted slidably within the guide tube, a drawing core carried at the inner end of said plunger, a collapsible and extensible flag mounted at the outer end of the plunger, circuit wiring from a suitable source of electric supply to selectively energize the drawing coil to project the signal flag to permit the same to expand beyond the open end of the case and to energize the return coil to retract the signal flag to be collapsed in the outer end of the case, said signal flag having different traffic indications on the two sides thereof, said plunger being provided with a longitudinal guide groove on one side and having a second guide groove branching helically therefrom and extending longitudinally on the opposite side, a plunger guiding switch mounted on the guide tube and having a point projecting into the guide grooves, a spring normally holding the switch with the point positioned to track in one of the grooves, and electrical means to shift the switch to position the point to track in the remaining guide groove, an electric lamp associated with the signal flag and colored on opposite sides to correspond to the indications of the two sides of the signal flag, and contacts on the guide tube and the plunger positioned to register when the signal flag is projected.

In testimony hereof we affix our signature.

DANIEL F. MURPHY.
LUKE COTTER.